Aug. 24, 1965  A. F. ARMINGTON ETAL  3,202,485
SUBLIMATION APPARATUS
Filed May 1, 1962

INVENTORS.
ALTON F. ARMINGTON &
JOSEPH R. WEINER
BY Wade Koontz
Sherman H. Goldman
ATTORNEYS 3,202,485
SUBLIMATION APPARATUS
Alton F. Armington, Lexington, and Joseph R. Weiner, Marblehead, Mass., assignors to the United States of America as represented by the Secretary of the Air Force
Filed May 1, 1962, Ser. No. 191,654
1 Claim. (Cl. 23—264)
(Granted under Title 35, U.S. Code (1952), sec. 266)

The invention described herein may be manufactured and used by or for the United States Government for governmental purposes without payment to us of any royalty thereon.

This invention relates generally to sublimation apparatus, and more particularly to a multiple sublimation apparatus suitable for small batch laboratory use.

In the preparation of pure materials, the process of sublimation is often utilized; however, most apparatus for this process are of high capacity and are not effective with small amounts of material.

This invention provides an apparatus which enables the sublimation of small batches of material without contamination from the container material and also allows for sublimation at temperatures as high as 1500° C. The foregoing is achieved by providing a pair of identical tubes arranged to be inserted partially within one another, and a plug which closes one end of the assembled tube. This apparatus may be enclosed within other apparatus to which a vacuum line is connected.

Accordingly, it is an object of this invention to provide for small batch sublimation without the use of extensive complicated equipment.

It is another object of this invention to provide for small batch apparatus which allows for sublimation at very high temperatures.

It is still another object of this invention to provide a simple, durable, easily constructed sublimation apparatus which is made of conventional currently available materials that lessen contamination and lend themselves to mass production manufacturing techniques.

It is a further object of this invention to provide sublimation apparatus which is useful for either single or multiple sublimation without separately transferring material for multiple sublimation.

These and other advantages, features and objects of the invention will become more apparent from the following description taken in connection with the illustrative embodiment in the accompanying drawing wherein.

Figure 3:
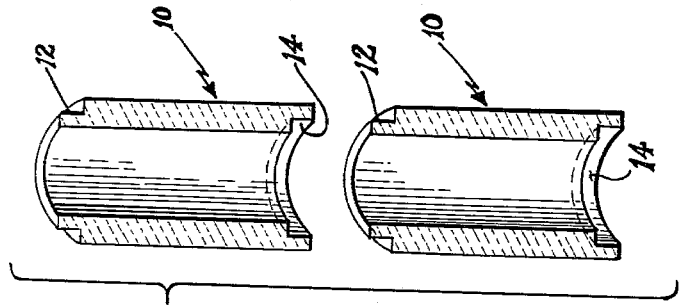
FIGURE 3 is a pictorial representation in cross-section of an exploded view of the sublimer tubes.
Figure 2:
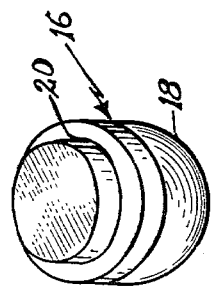
FIGURE 2 is a pictorial representation of the end of plug of the sublimer.
Figure 1:
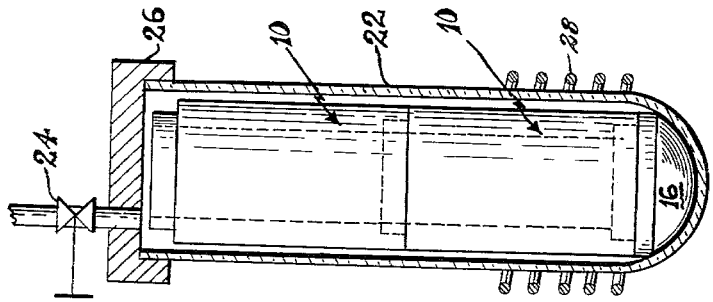
FIGURE 1 is a diagrammatic representation of the multiple sublimation apparatus of this invention.

Referring to the figures, the sublimation device comprises two identical graphite cylindrical tubes 10 having the outer diameter at one end reduced for a small distance therealong as is shown at 12. The inner diameter of the opposite end is increased at 14 by a like amount for an equal length. Thus, the two tubes 10 may be fitted together in order to form a single long tube. A friction fitted graphite plug 16 (FIG. 2) has a generally spherical portion 18 at one end and a reduced cylindrical portion 20 at the other. The cylindrical portion 20 is friction fitted within the lower graphite tube 10, thereby forming a bottom to the assembled tubes. Graphite was chosen as the material for the tubes since it is amenable to induction heating and may be utilized to heat the sublimation device up to as high as 1500° C.

Since graphite is porous, the sublimer is placed in a quartz, round bottomed tube 22 and sealed to a vacuum line in which valve 24 is located. The sealing means at 26 may be of any conventional type, and the representation shown is only to be considered as illustrative of a single embodiment.

In use, material is placed in the lowermost of the assembled tubes 10 with the plug 16 at the base, and if the tubes are made of graphite, the assembly is placed within the outer or quartz tube 22. After evacuation of the quartz tube 26, a conventional inductive heater 28 is utilized to heat the material at the bottom of the lower tube 10. Thus, when the material has condensed in the uppermost tube, the apparatus is shut off, the bottom tube is removed and cleaned by pressing the material out of the tube with a rod. Either it or a fresh tube is placed upon the first tube which now has the plug applied thereto and further sublimation may be effected.

Although the invention has been described with reference to a particular embodiment, it will be understood to those skilled in the art that the invention is capable of a variety of alternative embodiments within the spirit and scope of the appended claim.

We claim:
Sublimation apparatus comprising means for evacuating a container, a vertically oriented tube-shaped container having a closed end and an open end, said open end being sealed to said evacuating means, a pair of elongated, vertically oriented, interchangeable, open ended tubes of a size to be telescoped and inserted within said first-mentioned tube, said elongated tubes each having a portion of reduced external diameter at one end and increased internal diameter at the other end such that each of said elongated tubes may be partially inserted within the other of said elongated tubes, a removable, solid plug adapted to be inserted in the bottom one of the lowermost of said pair of elongated tubes with a tight fit and having a portion in contact with the closed end of said first-mentioned tube, and an induction heating means around the lower end of said tube-shaped container to heat a melt in the lowermost of said pair of elongated tubes within said container to cause condensation of said melt to form on the uppermost of said pair of elongated tubes.

References Cited by the Examiner
UNITED STATES PATENTS

| | | | |
|---|---|---|---|
| 1,545,353 | 7/25 | Roselli et al. | 220—4 X |
| 1,645,144 | 10/27 | Humphrey et al. | 23—264 |
| 2,933,384 | 4/60 | Welker et al. | 23—294 X |

FOREIGN PATENTS

| | | |
|---|---|---|
| 862,427 | 3/41 | France. |
| 816,620 | 7/59 | Great Britain. |

MORRIS O. WOLK, Primary Examiner.
JAMES H. TAYMAN, Jr., Examiner.